United States Patent [19]

Savic

[11] 4,375,661

[45] Mar. 1, 1983

[54] OVERVOLTAGE PROTECTION CIRCUIT FOR A TELEVISION

[75] Inventor: Stanley D. Savic, Westchester, Ill.

[73] Assignee: Zenith Radio Corporation, Glenview, Ill.

[21] Appl. No.: 296,101

[22] Filed: Aug. 26, 1981

Related U.S. Application Data

[63] Continuation of Ser. No. 73,777, Sep. 10, 1979, abandoned.

[51] Int. Cl.³ .................... H02H 3/14; H02H 3/20
[52] U.S. Cl. .................... 361/91; 315/411; 358/190; 358/245; 361/56; 361/118
[58] Field of Search .............. 361/118, 119, 129, 130, 361/91, 56, 43, 42, 15, 16, 117, 120; 358/190, 243, 245; 325/371; 315/3, 36, 411; 313/325, 441; 328/8, 10; 179/90, 78 A, 81 E

[56] References Cited

U.S. PATENT DOCUMENTS

| | | | |
|---|---|---|---|
| 1,531,971 | 3/1925 | Peek, Jr. | 361/130 X |
| 1,906,602 | 5/1933 | Hull | 361/120 |
| 2,032,566 | 3/1936 | Earle | 361/130 X |
| 2,172,640 | 9/1939 | Nelson | 361/39 |
| 3,375,436 | 3/1968 | Denton | 315/411 X |
| 3,668,465 | 6/1972 | Evans et al. | 361/118 X |
| 3,679,939 | 7/1972 | Nitta et al. | 361/129 |
| 3,965,393 | 6/1976 | Chamberlain | 358/243 X |

*Primary Examiner*—Patrick R. Salce

[57] ABSTRACT

Disclosed is an overvoltage protection circuit for use in a television receiver with a floating ground, high voltage, alternating or direct current power supply in which a protective network of two spark gaps in series across one of which is coupled a capristor (or a capacitor and resistor) is connected across an isolation network between high and low voltage grounds thus limiting the maximum potential difference and providing a reliable, safe means of discharging continuous or transient high voltages which may develop between the floating ground and fixed (earth) ground. Reliability is provided by the inherent characteristics of two spark gaps in series while safety is insured by the predictable breakdown of first one spark gap rapidly followed by the discharge of the second spark gap across which is connected the capristor.

3 Claims, 1 Drawing Figure

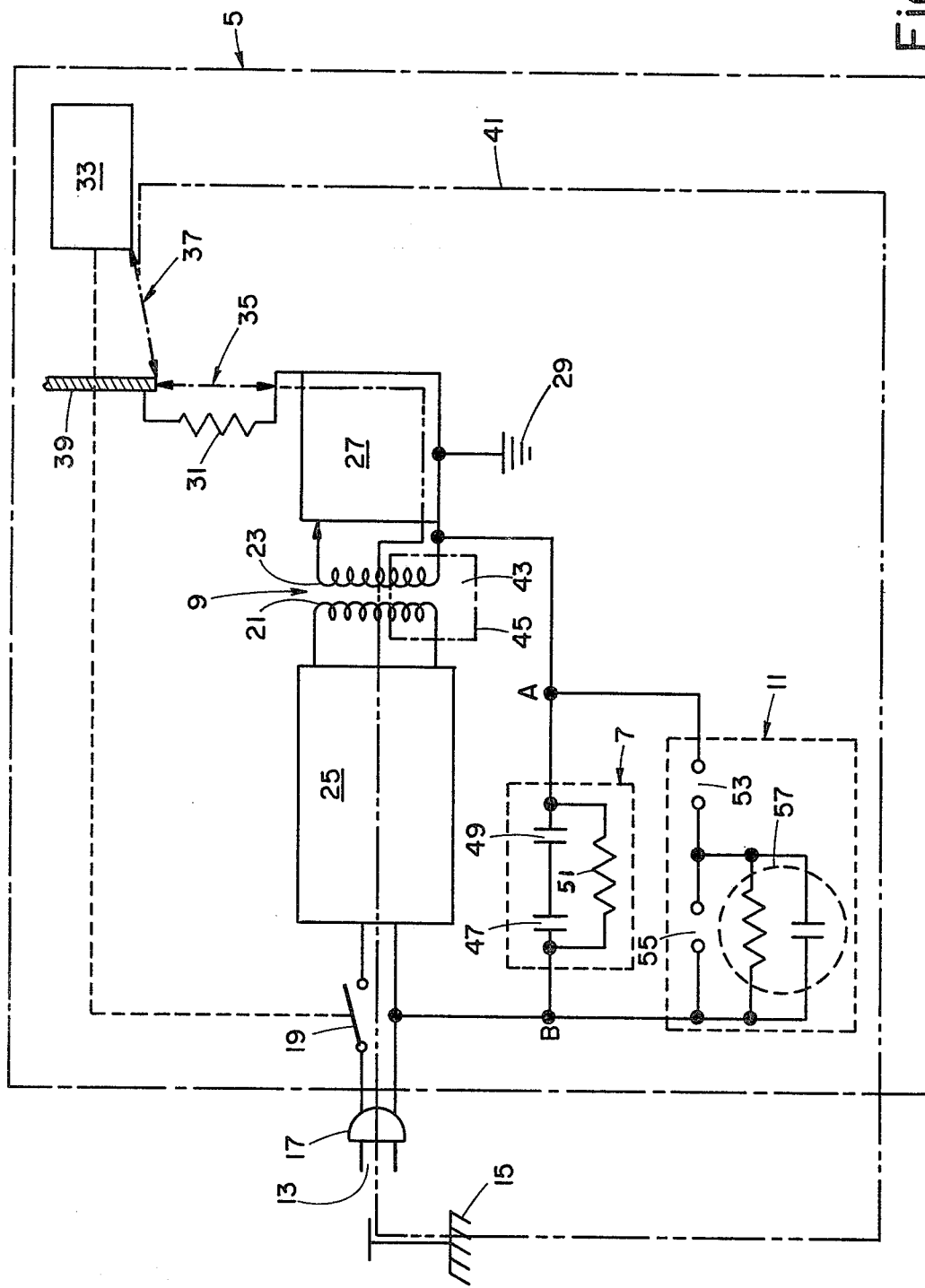

OVERVOLTAGE PROTECTION CIRCUIT FOR A TELEVISION

This application is a continuation of application Ser. No. 73,777, filed Sept. 10, 1979, now abandoned.

BACKGROUND OF THE INVENTION

This invention concerns an improved high voltage protection circuit for use in a television receiver with either an alternating or direct current power supply which is floating with respect to earth ground.

The use of high performance cathode ray tubes in television receivers has necessitated the utilization of relatively high voltages in these systems. As a result, current cathode ray tubes are increasingly subject to high voltage transients or arcing during operation. High voltage arcing not only deteriorates from television receiver performance but also is capable of severely damaging television receiver components. In addition, strict consumer safety guidelines have been imposed upon television receiver construction and design in order to minimize the danger of high voltage electrical shock to the user. Various regulations and standards have evolved in order to insure safe operation of the television receiver. For example, a spark gap in the television receiver which fires at 1.5 Kv in air is limited to approximately 0.015" gap space. Another industry safety standard requires that any circuit or component in the television receiver accessible by a user must be spaced at least 0.062" from the line voltage. These and other operating criteria necessitate sophisticated circuit design to accommodate the competing requirements of a high voltage confined to a small volume.

In a television receiver low voltage power supply is derived from the alternating current input line. The low voltage input is stepped up by means of a transformer to operate the receiver's high voltage components. The 120 volt input may thus be stepped up to as much as 30,000 volts. This high voltage power supply is indirectly referenced to earth ground by means of a floating electrical ground system. Referencing the floating ground system back to earth ground is typically accomplished by means of a resistor or capacitor or a combination thereof in a circuit. This circuit is referred to as an isolation circuit, or network, in that it serves the function of electrically isolating earth ground from the floating ground reference which may itself be at some voltage. It is desirable to limit the voltage at the floating ground with respect to earth ground because in the case of some high voltage power supply failures the high voltage would seek another conducting path to ground. For example, if a high voltage lead were to fall on a metal work bench during receiver servicing and the metal bench is grounded with the high voltage lead operating at +30 Kv for proper picture tube operation, this shorting to ground would cause the low end of the high voltage power supply, e.g., the ground for the CRT, to immediately seek −30 Kv because of the completely floating high voltage power supply. The high voltage lead would thus establish a reference with the lower end seeking the same voltage relationship to it, i.e., −30 Kv.

Servicing and user accessibility are not the only potential causes of high voltage discharge in television receivers. High voltage transformer breakdown caused by improper or inadequate winding insulation is another source of high voltage discharge. As a result, various approaches have been taken to reduce the hazard of high voltage discharge in a television receiver.

One approach to solving this problem involves simply increasing the inter-winding insulation in the high voltage transformer. But this approach places a severe burden on the design of today's microcircuits for incorporation in an already cramped television chassis while overrelying on transformer wrapping techniques and materials. Another approach to solving this problem is the utilization of a MOV device which is essentially a back-to-back Zener diode operating on alternating current which breaks down any time the voltage exceeds a predetermined value. These MOV devices are typically placed across the low to high voltage line so that when a large transient voltage appears on the line between the low and high voltage wires the MOV absorbs this transient high voltage without letting it pass through the circuit thus acting as a short circuit in protecting other components from high voltage damage. The MOV directly absorbs the high voltage energy, however, and MOV's currently commercially available would be able to withstand the 30 Kv discharge of a television receiver for only an extremely short period of time. In addition, MOV's are not commercially recognized as a safety device in isolating a user from a high voltage line.

Still another approach to reducing the hazard of high voltage discharge in a television receiver is disclosed in U.S. Pat. No. 3,668,465. Described therein is a semiconductor circuit which provides excessively high surge transient voltage protection for a cathode ray tube relying essentially on the electrical isolation provided by a spark gap device. However, these devices are subject to particle contamination, moisture accumulation or even mechanical reconfiguration (damage) all of which may result in unstable performance as exhibited by premature voltage breakdown. These and other shortcomings of the prior art are overcome by the present invention which couples a plurality of voltage discharge devices in series across an isolation network between high and low voltage sources. Series operation of these independent voltage discharge devices significantly increases discharge network reliability in meeting consumer product safety requirements while also, by coupling a capristor across one of the discharge devices, provides excellent line isolation and high voltage discharge protection.

OBJECTS OF THE INVENTION

It is an object of the present invention to provide an improved high voltage surge protection circuit in a television receiver.

Another object of the present invention is to provide a reliable and safe high voltage surge protection circuit for use in a television receiver with a floating ground, high voltage, direct or alternating current power supply.

Still another object of the present invention is to provide a reliable and safe high voltage protective circuit coupled across an isolation network between high and low voltage sources in a television receiver.

BRIEF DESCRIPTION OF THE DRAWING

The appended claims set forth those novel features believed characteristic of the invention. However, the invention itself, as well as further objects and advantages thereof, will best be understood by reference to the following detailed description of a preferred embodiment taken in conjunction with the accompanying the FIGURE of the drawing showing a schematic diagram of the high voltage circuitry in a floating ground television receiver in which an overvoltage protection circuit is coupled across the low end of the high voltage, or sweep, transformer and earth ground, or the low voltage supply, in accordance with the present invention. Also shown are some of the high voltage failure modes of this system.

DESCRIPTION OF THE PREFERRED EMBODIMENT

Referring to the schematic diagram of the FIGURE, there is shown the high voltage circuitry in a floating ground television receiver 5 in which an isolation and referencing network 7 is incorporated across the low to high voltage transformer 9 with an overvoltage protection circuit 11 coupled across the isolation network 7 in accordance with the present invention. The input power line 13 typically is a 120 volt AC conductor which is grounded to earth 15, although any voltage input could feasibly be used. The television receiver 5 is connected to the AC input line 13 by means of the plug assembly 17. An ON/OFF switch 19 on the television receiver 5 controls the application of input power to the receiver. The 120 volt input is connected to the low voltage winding 21 of transformer 9 which steps up the input voltage to approximately the 30 Kv applied across the high voltage winding 23. A low voltage power supply 25 is operated by the 120 volt input in energizing the low voltage winding. The low voltage power supply 25 is referenced to earth ground. The high voltage winding 23 of transformer 9 energizes a high voltage power supply 27 which in turn operates various components of the television receiver including the CRT. Low voltage isolation network 7 provides line protection and isolation for the 120 volt input line relative to the floating ground 29 of the high voltage winding 23. A high voltage isolation network 31 provides line protection and isolation for the floating ground 29 of the high voltage winding 23 relative to earth ground. Typically mounted on the television receiver chassis 5 is metalized control button 33 for ON/OFF control of the television receiver's ON/OFF switch 19.

The most common cause of high voltage discharge in the system shown in FIGURE is breakdown between the windings of the high voltage, or sweep, transformer 9. This inter-winding breakdown is generally due to faulty or inadequate insulation disposed between the individual windings. The high voltage discharge resulting from this transformer breakdown can take many paths. One such discharge path is across the gap 35 produced by the high voltage isolation network 31 and the gap 37 between the metalized control button 33 and a metal bracket 39 typically mounted in the receiver chassis adjacent to its outer cabinet. A voltage transient will jump across both of these gaps, 35 and 37, if an external earth ground is introduced to the metalized control button 33 at the time the television receiver 5 is turned on. The path of the resultant transient high current loop is shown by a dotted line 41 running from the high voltage power supply 27 through the high voltage isolation network gap 35 across to the metalized control button 33 and then to earth ground 15. Another high voltage discharge path is across the printed circuit board 43 upon which is mounted the high voltage transformer 9. A high voltage transient will jump across this printed circuit board 43 if no external earth ground is introduced to the system. The resulting internal transient current loop 45 will be produced on the printed circuit board 43. The present invention is designed to provide a safe means of high-voltage discharge by avoiding discharge along one of the aforementioned paths and the attendant high risk to the user.

The low ends of both the low voltage and high voltage power supplies, 25 and 27, are generally referenced together in a floating ground high voltage system by means of an isolation network 7. This isolation network 7 possesses a fairly high impedance reference and typically consists of a resistor or a capacitor or a combination thereof. A system now commercially available has an isolation network 7 which has in combination two capacitors, 47 and 49, in series, with a resistor 51 coupled in parallel across the two capacitors. Typical values utilized for these components are 0.01 microfarads for the capacitors and 1.2 megohms for the resistor. The low voltage isolation network 7 references the low ends of both the low voltage power supply 25 and the high voltage power supply 27 to the same floating ground potential level. If a leak or a short develops in the high voltage transformer 9 the low end of the high voltage supply 27 becomes referenced not to earth ground but to a negative voltage which could be equal in magnitude to or less than the value of the high voltage power supply prior to the leak or short. Contacting the reference floating ground potential would thus result in a shock to the user or damage to components of the television receiver. In providing a discharge path across the isolation network 7 this circuit is designed to keep voltage across the isolation network 7 no greater than a predetermined value as dictated by safety standards and circuit component values. In the present invention, two spark gaps, 53 and 55, in series are coupled across the isolation network 7. Coupled across one of the spark gaps 55 is a capacitor 57 which has the operating characteristics of both a capacitor and a resistor and typically is rated in terms of its ability to withstand voltage. Because of its unique operating characteristics it is typically specified in units of capacitance and resistance. In the present application a capristor having a capacitance rating of approximately 600 picofarads and a resistance rating of 1.2 megohms is utilized. These operating parameters permit the capristor to pass UHF and VHF frequencies from the antenna (not shown) in the receiving system. The capristor 57 in the present application could be equated by using a discrete resistor in combination with a discrete capacitor to achieve the same effect. However this would increase installation and component costs. As a high voltage safety device capristors meet consumer product safety criteria for devices which can be placed between the user and the line voltage because of the high impedance they provide in safeguarding against electrical shock.

The overvoltage protection circuit 11 operates in the following manner. A high voltage is applied between the high voltage winding 23 and the low voltage power supply 25 or the input power line 13. This high potential difference is also applied across isolation network 7 as shown in FIG. 1. Across isolation network 7 is coupled the overvoltage protection circuit in which a first spark gap 53 is connected in series with a second spark gap 55. Coupled across the second spark gap 55 is capristor 57. With the high potential difference applied across the isolation network 7 and the overvoltage protection circuit 11, the full voltage drop between points A and B is initially applied to first spark gap 53. The second spark gap 55 will be subjected to the full potential difference between points A and B only upon the breakdown of the first spark gap 53 which will discharge when its specified discharge rating is exceeded. When the current starts to flow through first spark gap 53, i.e., when arcover occurs, the second spark gap 55 will be subjected to a voltage greater than its rating or a voltage nearly equivalent to the voltage between points A and B. The rapid sequential breakdown of spark gaps 53 and 55 produces a "bang-bang" -type of voltage discharge.

In general, the cumulative effects of two spark gaps in series are not additive. For example, one spark gap rated at 1 Kv firing voltage in series with another spark gap rated at 2 Kv firing voltage would have a total breakdown voltage rating for this configuration of 2 Kv. Selection of spark gaps possessing different firing voltage ratings would therefore result in a step wise sequence of voltage discharge. However, in the present application it is desirable to have a level discharge rating as low as possible for safety reasons while at the same time realizing the enhanced safety offered by spark gaps in series. Thus, spark gaps 53 and 55 in the present invention are selected to operate at the same firing voltage which is the firing voltage of the entire overvoltage protection circuit 11 while at the same time the two independent spark gaps in series, complementing on another should one spark gap short out, satisfy consumer product reliability criteria for high voltage devices. The present invention takes advantage of the inherent reliability of spark gaps in series in combination with rapid sequential spark gap firing by means of a capistor coupled across one spark gap to provide a safe, reliable means of high voltage discharge in a television receiver.

In some applications a faster firing sequence may be desireable than that of the preferred embodiment of the present invention. This can be realized by selecting a second spark gap 55 having a slightly lower firing voltage than the first spark gap 53 resulting in a faster triggering of the entire discharge system. A faster breakdown sequence of the discharge system may be desireable in a given system because a single spark gap discharging alone may not provide passage of sufficient current to limit the voltage from point A to point B. This delay in system discharge and the resulting stress on the capristor could result in either damage to the capristor or an overvoltage surge in the system greater than the rated values of the spark gaps. A faster overall discharge rate was not sought in the preferred embodiment of the present invention because selected component operating parameters and overall system design made such overprotection unnecessary. Thus, in the preferred embodiment of the present invention, now commercially available, first spark gap 53 and second gap 55 possess equal voltage breakdown ratings. Table I presents selected values of the primary components in the preferred embodiment of the present invention.

TABLE I

| COMPONENT | PREFERRED RATING |
| --- | --- |
| Isolation Network Capacitors 47 and 49 | 0.01 microfarads |
| Isolation Network Resistor 51 | 1.2 megohms |
| Overvoltage Protection Spark Gaps 53 and 55 | 1.5 kilovolts |
| Capristor 57 | 600 picofarads 1.2 megohms |

While the present invention has been described as coupling the low end of the high voltage, or sweep, transformer to earth ground, or the low voltage supply, the unique spark gap configuration of the present invention could be used to provide overvoltage protection even if the high voltage transformer were not present in the system. For example, the sweep transformer could be driven directly by the line voltage using a transistor drive circuit to operate the sweep transformer at high frequency. The present invention could be used in this system configuration to provide overvoltage protection also. In addition, while the system is described as using a switched line voltage because of the presence of the switched mode power supply the present invention is not limited in its application to this type of design but could be utilized in any electrical system where two voltage sources are floating with respect to each other. Finally, it should be noted that the present invention will provide overvoltage protection between the low end of the high voltage transformer and earth ground regardless of whether or not an isolation network is incorporated between these two points in the television receiver. Safety requirements mandate the incorporation of an isolation network when using an outdoor antenna as protection against static discharge. If the antenna mounted to the television receiver is used this isolation is no longer required. It should also be noted that the present invention will provide overvoltage protection across an isolation network regardless of how many capacitors are present in the isolation network. Indeed, there doesn't have to be any capacitors or resistors present in the isolation network in order for the present invention to provide adequate overvoltage protection.

There has thus been provided an overvoltage protection circuit for use with a floating power supply which, by uniquely taking advantage of the operating characteristics of spark gaps in series in combination with a capristor, provides a safe means of discharge over a short space and a reliable configuration in which the spark gaps act to complement, or back up, one another.

While particular embodiments of the invention have been shown and described, it will be obvious to those skilled in the art that changes and modifications may be made without departing from the invention in its broader aspects and, therefore the aim in the appended claims is to cover all such changes and modifications as fall within the true spirit and scope of the invention.

I claim:

1. A transient high voltage viewer protection network for a television receiver having a high voltage source floating with respect to earth ground and a low voltage source and including a high voltage transformer having a primary winding energized by said low voltage source and a secondary winding for energizing said high voltage source, said viewer protection network comprising:

a first high threshold voltage rapid discharge device having first and second electrodes, said first electrode coupled to the secondary winding of said high voltage transformer;

a second high threshold voltage rapid discharge device having third and fourth electrodes, said third electrode coupled to the second electrode of said first high threshold voltage rapid discharge device and said fourth electrode coupled to said low voltage source, said first and second high threshold voltage rapid discharge devices having essentially equal breakdown voltage ratings; and parallel capacitor-resistor means coupled across said second high threshold voltage rapid discharge device, such that a transient high voltage discharge in said high voltage transformer causes the first high threshold voltage rapid discharge device to discharge when its breakdown voltage rating is exceeded, rapidly followed by the discharge of said second high threshold voltage rapid discharge device thereby limiting the potential difference between said high voltage transformer and said low voltage source by providing a safe means for high voltage discharge in protecting the viewer of said television receiver from high voltage shock.

2. The system as described in claim 1 wherein said high threshold voltage rapid discharge devices are spark gaps.

3. A transient high voltage viewer protection network in a television receiver having a high voltage transformer including a primary winding energized by a low voltage source and a secondary winding for energizing a high voltage source floating with respect to earth ground, wherein voltage isolation means are coupled across the secondary winding of said high voltage transformer and said low voltage source for providing a reliable and safe means for transient high voltage discharge in said high voltage transformer, said protection network comprising:

a first high threshold voltage rapid discharge device having first and second electrodes, said first electrode coupled to the secondary winding of said high voltage transformer;

a second high threshold voltage rapid discharge device having third and fourth electrodes, said third electrode coupled to the second electrode of said first high threshold voltage rapid discharge device and said fourth electrode coupled to said low voltage source, said first and second high threshold voltage rapid discharge devices having essentially equal breakdown voltage ratings; and capristor means coupled across said second high threshold voltage rapid discharge device, such that a transient high voltage discharge in said high voltage transformer causes the first high threshold voltage rapid discharge device to discharge when its breakdown voltage rating is exceeded, rapidly followed by the discharge of said second high threshold voltage rapid discharge device thereby limiting the potential difference between said high voltage transformer and said low voltage source by providing a safe means for high voltage discharge in protecting the viewer of said television receiver from high voltage shock.

* * * * *